United States Patent
Kamita et al.

(10) Patent No.: US 8,419,928 B2
(45) Date of Patent: Apr. 16, 2013

(54) HYDROCARBON FUEL OIL FOR USE IN FUEL CELL SYSTEM

(75) Inventors: Osamu Kamita, Tokyo (JP); Akihiko Matsuoka, Tokyo (JP)

(73) Assignee: Shell Oil Company, Houston, TX (US)

(*) Notice: Subject to any disclaimer, the term of this patent is extended or adjusted under 35 U.S.C. 154(b) by 57 days.

(21) Appl. No.: 12/566,824

(22) Filed: Sep. 25, 2009

(65) Prior Publication Data

US 2010/0076232 A1    Mar. 25, 2010

(30) Foreign Application Priority Data

Sep. 25, 2008 (JP) ................................ 2008-245238

(51) Int. Cl.
*C10L 1/04* (2006.01)
*C10L 1/16* (2006.01)

(52) U.S. Cl.
USPC .............. 208/15; 208/16; 585/14; 44/300

(58) Field of Classification Search ......... 208/15, 208/16; 585/14; 44/300
See application file for complete search history.

(56) References Cited

U.S. PATENT DOCUMENTS

| 7,141,084 | B2 * | 11/2006 | Saitou et al. | 44/451 |
|---|---|---|---|---|
| 7,533,700 | B2 * | 5/2009 | Butler et al. | 141/11 |
| 7,556,727 | B2 * | 7/2009 | Shibuya et al. | 208/15 |
| 7,666,294 | B2 * | 2/2010 | Bauldreay et al. | 208/15 |
| 7,785,378 | B2 * | 8/2010 | O'Rear | 44/452 |
| 2003/0162060 | A1 * | 8/2003 | Butler et al. | 429/17 |
| 2004/0149627 | A1 * | 8/2004 | Koide et al. | 208/15 |
| 2006/0052650 | A1 * | 3/2006 | Thebault et al. | 585/14 |
| 2008/0076949 | A1 * | 3/2008 | Dancuart et al. | 585/14 |
| 2008/0155887 | A1 * | 7/2008 | Clark et al. | 44/300 |

FOREIGN PATENT DOCUMENTS

| EP | 1243636 | 9/2002 |
|---|---|---|
| JP | 2002080868 | 3/2002 |
| JP | 2002083626 | 3/2002 |
| WO | WO0061707 | 10/2000 |
| WO | WO2004050804 | 6/2004 |

OTHER PUBLICATIONS

EPO-Communication—May 27, 2011 for Application No. 09 171 278.6-2104 for TS8158 EPC.
Anonymous, "INEOS Isoalkanes in Cosmetic Formulation—General Product Information," [online] Sep. 2006, pp. 1-5, XP002562303.
Jiro Funaki et al., "Thermal Characteristics of Heavy-Hydrocarbons-Fuel Reactor for Fuel Cell System," Jan. 1, 2007, *Challenges of Power Engineering and Environment: Proceedings of the International Conference on Power Engineering 2007*, Springer, Berlin, DE, pp. 982-985, XP009148636.

* cited by examiner

Primary Examiner — Ellen McAvoy

(57) ABSTRACT

Hydrocarbon fuel oil with paraffins as the main constituent for use in fuel cell systems is provided having
(1) paraffins of less than 13 carbons constitute not less than 60% by mass;
(2) isoparaffins of 15 or more carbons constitute from 0.01 to 9% by mass; and
(3) normal paraffins of 13 or more carbons constitute not more than 2% by mass.
Also, in addition to the aforementioned compositions (1) to (3), it is preferable if isoparaffins of 17 or more carbons constitute not more than 3% by mass.

23 Claims, 5 Drawing Sheets

◇ Example 1      △ Example 2      ○ Example 3
● Comparative Example 1      ◆ Comparative Example 2
■ Comparative Example 3      ▲ Comparative Example 4

HYDROCARBON FUEL OIL FOR USE IN FUEL CELL SYSTEM

FIELD OF THE INVENTION

The present invention relates to hydrocarbon fuel oils used in generating hydrogen in fuel cell systems.

BACKGROUND OF THE INVENTION

In the light of environmental problems, fuel cells have been attracting attention in recent years. Various kinds of research have been undertaken with a view to making them a practical reality. Some of the topics in this research have been methods for producing hydrogen and methods for supplying it. From the standpoint of safety during handling and the possibility of using existing infrastructure, various suggestions have been made regarding methods of reforming mineral oils and synthetic oils derived from fossil fuels, that is hydrocarbon fuel oils, into hydrogen.

For example, JP-A-2002-80868 and JP-A-2002-83626 disclose techniques which, by using in the fuel cells a fuel comprised of hydrocarbon compounds with specific composition and distillation characteristics, are intended not only to make it possible to obtain electrical energy at high outputs with a low rate of performance reduction, but also to satisfy various kinds of performance for use in fuel cells.

Also, in response to environmental issues, automotive exhaust gas regulations are becoming more widespread, and on account of these regulations there is demand for fuels that are sulphur free and have no soot emissions. In other words, making hydrocarbon fuels cleaner is an important issue. Meanwhile, there is demand for reducing the sulphur in fuels from the standpoint of making reformers more compact and of preventing catalyst degradation.

To produce fuels with a low sulphur content, it is beneficial in manufacturing terms to use fuel components that have a very low sulphur content. As examples of such fuel components, mention may be made of hydrocracked oils, lightened LGO (light gas oil), or GTL (Gas to Liquid) fuels produced by a Fischer-Tropsch reaction from synthesis gas (CO, $H_2$). Of these, GTL fuels in particular have only minute sulphur and aromatics contents and so are regarded as promising for fuels of the future. They have also been considered in the aforementioned JP-A-2002-80868 and JP-A-2002-83626.

In fuel cell systems where hydrogen is obtained by reforming hydrocarbon fuel oil, since it is necessary to heat the fuel and reforming apparatus, if the temperature required to reform the fuel is low, the amount of heat will be reduced, and it may be said that the efficiency of the system will thus be increased, which is desirable.

As regards the heat required for reforming, methods of burning part of the fuel used for reforming may be considered, but if use is made of off-gas from the fuel cells, there are advantages such as being able to make the apparatus smaller, which is to be preferred. However, in this case, the amount of heat generated by the off-gas is preferably the amount of heat required to maintain the temperature of the reforming apparatus. This amount of heat generated by the off-gas is determined by the composition (in particular, the hydrogen and methane concentrations), but this composition is determined by the state of the reaction at the reforming apparatus outlet, that is by the outlet temperature. Therefore, in cases where the off-gas is a heat source for the reforming apparatus, the outlet temperature of the reforming apparatus is subject to a constraint in order to maintain the amount of off-gas heat generated. Consequently, in fuel cell systems where off-gas is used as a reforming apparatus heat source, it is more effective, in order to improve its efficiency, if the inlet temperature of the reforming apparatus is reduced.

Also, the lighter are the hydrocarbon fuel oils, that is, the higher is the proportion of hydrocarbons with a small number of carbons, the greater is the efficiency of conversion to hydrogen, and the more it is effective to make the fuels light in order to reduce the inlet temperature. But with light fuels there is a tendency for the flash point to decrease and there is a danger that safety will be compromised during handling. For this reason, from the standpoint of increasing production of hydrocarbon fuels, it may be said that it is preferable to make them as heavy as possible, that is to increase the proportion of hydrocarbons with a large number of carbons, but in the technology of the prior art no account has been taken of reducing the inlet temperature in the reforming apparatus. Indeed, there has been no research on making fuels heavier.

Furthermore, GTL fuels, which are regarded as promising for fuels of the future, are fuels in which paraffins are the main constituents with trace amounts of aromatics, olefins and naphthenes. Although there is a possibility that the distribution of their carbons and the composition ratio of isoparaffins and normal paraffins may affect the ease of reforming, there has been no research either that takes account of this point.

SUMMARY OF THE INVENTION

Accordingly, a hydrocarbon fuel oil is provided with paraffins as the main constituent for use in fuel cell systems having (1) paraffins of less than 13 carbons constitute not less than 60% by mass;
(2) isoparaffins of 15 or more carbons constitute from 0.01 to 9% by mass; and
(3) normal paraffins of 13 or more carbons constitute not more than 2% by mass.

DETAILED DESCRIPTION OF THE INVENTION

Figure 1:
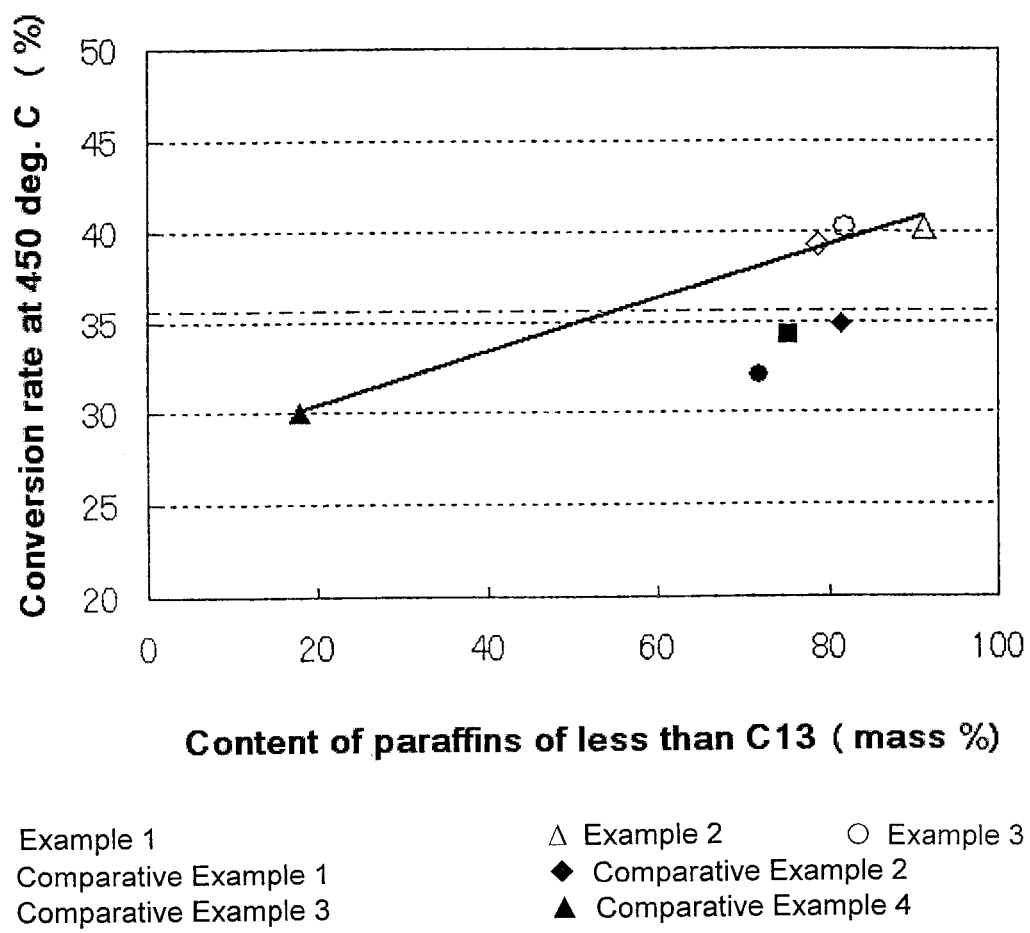
FIG. 1—This figure represents a graph showing the relationship of the content of paraffins of less than 13 carbons and the conversion rate at 450° C.

The present invention provides a hydrocarbon fuel oil for use in fuel cell systems which has as its main constituent paraffins wherein the proportion of hydrocarbons with a large number of carbons is high, and whereby it is possible to reduce the inlet temperature of the reforming apparatus in fuel cell systems where hydrogen is obtained by reforming a hydrocarbon fuel oil.

In accordance with the present invention there is provided a hydrocarbon fuel oil with paraffins as the main constituent for use in fuel cell systems, that satisfies the following compositions (1) to (3):
(1) paraffins of less than 13 carbons constitute not less than 60% by mass;
(2) isoparaffins of 15 or more carbons constitute from 0.01 to 9% by mass; and
(3) normal paraffins of 13 or more carbons constitute not more than 2% by mass.

Preferably, isoparaffins or 15 or more carbons constitute from 1.8 to 9% by mass, more preferably from 2 to 9% by mass.

Preferably, isoparaffins of 15 or more carbons constitute not more than 7% by mass.

Also, in addition to the aforementioned compositions (1) to (3), it is preferable if isoparaffins of 17 or more carbons are in the amount of not more than 3% by mass.

Preferably, paraffins of less than 13 carbons constitute not less than 70% by mass, more preferably not less than 75% by mass.

Preferably, normal paraffins of 13 or more carbons constitute not more than 1% by mass, more preferably not more than 0.5% by mass.

In the present invention, what is meant by "with paraffins as the main constituent" is that the total of isoparaffins and normal paraffins is not less than 99% by mass. This value is obtained in accordance with ASTM D5291, "Standard Test Methods for Instrumental Determination of Carbon, Hydrogen, and Nitrogen in Petroleum Products and Lubricants".

According to the present invention, it is possible to incorporate isoparaffins of 15 or more carbons, normal paraffins of 13 or more carbons and isoparaffins of 17 or more carbons up to specified ratios, and so to produce a heavier hydrocarbon fuel oil for use in fuel cell systems, whilst thus enabling superior safety during handling with higher flash points and a reduction of the inlet temperature of the reforming apparatus to 310° C.

The lower is the inlet temperature of the reforming apparatus, the more advantageous it is from the viewpoint of starting characteristics and efficiency, but if that temperature is reduced too much, there will be concerns that the distillation boiling point of the hydrocarbon fuel oil which constitutes the raw material for the hydrogen will be too low and that the raw material gas will end up condensing. However, with the configuration of the present invention, reforming is possible even if the inlet temperature is 310° C.

The hydrocarbon fuel oil of the present invention for use in fuel cell systems is explained in detail below.

The hydrocarbon fuel oil of the present invention for use in fuel cell systems can be obtained by, for example, obtaining syngas by, for example, partial oxidation or steam reforming from, for example, natural gas or coal, turning this into a long-chain alkyl hydrocarbon polymer oil by means of a Fischer-Tropsch reaction, and then hydrocracking or distilling to control the desired properties. However, the methods of manufacture are not limited to these.

The composition is such that paraffins of less than 13 carbons constitute not less than 60% by mass, isoparaffins of 15 or more carbons constitute from 0.01 to 9% by mass, preferably from 1.8 to 9% by mass, more preferably from 2 to 9% by mass, and normal paraffins of 13 or more carbons constitute not more than 2% by mass. Preferably, isoparaffins of 17 or more carbons should constitute not more than 3% by mass. If there are too many hydrocarbons with a low number of carbons, the conversion rate at low temperatures (rate of conversion to hydrogen) may improve and the inlet temperature be reduced further, but safety during handling will be reduced. Also, if there are too many hydrocarbons with a large number of carbons, the conversion rate at low temperatures will decrease and the inlet temperature will rise.

While the invention is susceptible to various modifications and alternative forms, specific embodiments thereof are shown by way of examples herein described in detail. It should be understood, that the detailed descriptions thereto are not intended to limit the invention. The present invention will be illustrated by the following illustrative embodiment, which is provided for illustration only and is not to be construed as limiting the claimed invention in any way.

EXAMPLES

Hydrocarbon fuel oils were obtained comprised of an oil being a mixture of normal paraffins and isoparaffins produced by the SMDS (Shell Middle Distillate Synthesis) process, and regulated oil mixtures in which the distillation characteristics and compositions of the aforesaid oil were regulated by using an isoparaffin solvent, and further the aforesaid isoparaffin solvent. The properties of the hydrocarbon fuel oils obtained are shown in Table 1 and their compositions in Table 2. However, the present invention is in no way limited by these Examples. What is meant by the SMDS process is a process comprising partial oxidation of natural gas, synthesis of heavy paraffins by Fischer-Tropsch synthesis, and hydrocracking and distillation of the heavy paraffin oils obtained so as to obtain naphtha, kerosene and light oil fractions.

TABLE 1

|  |  | Ex. 1 | Ex. 2 | Ex. 3 | Comp. Ex. 1 | Comp. Ex. 2 | Comp. Ex. 3 | Comp. Ex. 4 |
|---|---|---|---|---|---|---|---|---|
| Density @ 15° C. | g/cm³ | 0.7558 | 0.7429 | 0.7521 | 0.7602 | 0.7451 | 0.7484 | 0.796 |
| Sulphur content | ppm | <1 | <1 | <1 | <1 | <1 | <1 | <1 |
| Distillation characteristics | | | | | | | | |
| Initial boiling point | ° C. | 125.2 | 124.6 | 125.4 | 124.4 | 124.6 | 124.6 | 192.4 |
| 10% distillation | ° C. | 150.4 | 150.8 | 151.4 | 150.8 | 151.0 | 151.0 | 212.2 |
| 20% distillation | ° C. | 154.4 | 152.4 | 158.4 | 158.2 | 156.2 | 158.6 | 221.4 |
| 30% distillation | ° C. | 165.2 | 163.6 | 167.6 | 170.8 | 166.2 | 167.4 | 227.8 |
| 40% distillation | ° C. | 174.2 | 167.6 | 175.4 | 176.2 | 174.8 | 175.2 | 234.2 |
| 50% distillation | ° C. | 180.0 | 175.0 | 185.4 | 187.8 | 179.2 | 186.2 | 241.0 |
| 60% distillation | ° C. | 194.8 | 177.8 | 196.8 | 202.2 | 189.6 | 198.4 | 245.8 |
| 70% distillation | ° C. | 207.2 | 188.4 | 207.2 | 219.0 | 204.8 | 214.8 | 250.4 |
| 80% distillation | ° C. | 226.0 | 198.4 | 214.6 | 242.6 | 221.2 | 238.4 | 254.4 |
| 90% distillation | ° C. | 247.4 | 212.0 | 226.0 | 259.8 | 245.8 | 265.2 | 258.2 |
| 95% distillation | ° C. | 254.6 | 240.0 | 231.8 | 292.6 | 257.2 | 292.6 | 260.6 |

TABLE 1-continued

|  |  | Ex. 1 | Ex. 2 | Ex. 3 | Comp. Ex. 1 | Comp. Ex. 2 | Comp. Ex. 3 | Comp. Ex. 4 |
|---|---|---|---|---|---|---|---|---|
| 97% distillation | °C. | 257.8 | 249.8 | 235.4 | 301.6 | 263.4 | 304.6 | 261.8 |
| End point | °C. | 270.6 | 262.6 | 243.2 | 316.0 | 273.4 | 320.0 | 265.8 |
| CH analysis | | | | | | | | |
| Carbon | Mass % | 84.6 | 84.5 | 84.6 | 84.6 | 84.5 | 84.5 | 84.5 |
| Hydrogen | Mass % | 15.4 | 15.5 | 15.4 | 15.4 | 15.5 | 15.5 | 15.5 |

The densities in Table 1 are densities at 15° C. measured in accordance with JIS K 2249 "Crude petroleum and petroleum products—Determination of density and density/mass/volume conversion tables", the sulphur content is the sulphur content measured in accordance with JIS K 2541-2 "Crude petroleum and petroleum products—Determination of sulphur content", and as regards the distillation characteristics, the temperature and CH analysis at the various fraction outputs measured by "JIS K 2254 "Petroleum products—Determination of distillation characteristics, 6. Determination of distillation characteristics by gas chromatography" are in accordance with ASTM D5291, "Standard Test Methods for Instrumental Determination of Carbon, Hydrogen, and Nitrogen in Petroleum Products and Lubricants".

while the content of isoparaffins of number of carbons N was obtained from the sum of the chromatogram area values of the peaks between the peaks due to normal paraffins of N-1 carbons and the peaks of normal paraffins of N carbons. The gas chromatography detector was a hydrogen flame ionisation type detector (FID), and so the measurement sensitivity was proportionate to the number of carbons in the paraffins. Therefore, taking account of this sensitivity, the content molar ratios were obtained from the peak values and finally each mass ratio was obtained.

The column type in the gas chromatography was HP5 (length: 30 m, internal diameter: 0.32 mm, liquid layer thickness: 0.25 μm), and the various analysis conditions were as follows.

TABLE 2

| | Ex. 1 | Ex. 2 | Ex. 3 | Comp. Ex. 1 | Comp. Ex. 2 | Comp. Ex. 3 | Comp. Ex. 4 |
|---|---|---|---|---|---|---|---|
| n-Paraffins | | | | | | | |
| C7 or less | 0.01 | 0.01 | 0.02 | | 0.03 | 0.03 | |
| C8 | 0.78 | 0.89 | 0.61 | 0.63 | 0.86 | 0.79 | |
| C9 | 13.87 | 16.71 | 11.86 | 13.60 | 14.30 | 13.04 | |
| C10 | 12.93 | 16.07 | 11.79 | 12.49 | 13.62 | 12.57 | |
| C11 | 2.66 | 3.30 | 2.73 | 2.46 | 2.97 | 2.80 | |
| C12 | 0.60 | 0.49 | 0.98 | 0.58 | 1.52 | 1.46 | |
| C13 | | 0.01 | 0.28 | | 1.05 | 1.03 | |
| C14 | | | | | 0.92 | 0.90 | |
| C15 | | | | | 0.36 | 0.52 | |
| C16 | | | | | | 0.29 | |
| C17 | | | | | | 0.28 | |
| C18 | | | | | | 0.37 | |
| C19 | | | | | | 0.01 | |
| i-Paraffins | | | | | | | |
| C7 or less | | | | | 0.01 | 0.01 | |
| C8 | 0.14 | 0.17 | 0.13 | 0.11 | 0.21 | 0.20 | |
| C9 | 5.25 | 6.29 | 4.39 | 4.32 | 5.47 | 5.00 | |
| C10 | 16.17 | 19.83 | 14.34 | 14.00 | 16.96 | 15.59 | |
| C11 | 13.82 | 16.72 | 14.24 | 12.06 | 14.41 | 13.46 | 1.34 |
| C12 | 12.44 | 10.90 | 20.70 | 11.69 | 11.03 | 10.48 | 16.49 |
| C13 | 6.78 | 3.11 | 14.72 | 6.60 | 6.19 | 5.96 | 27.24 |
| C14 | 9.42 | 3.66 | 3.20 | 8.66 | 5.47 | 5.33 | 36.54 |
| C15 | 5.11 | 1.81 | 0.01 | 5.66 | 4.06 | 4.26 | 18.08 |
| C16 | 0.02 | 0.03 | | 1.32 | 0.56 | 1.91 | 0.31 |
| C17 | | | | 2.86 | | 1.53 | |
| C18 | | | | 2.33 | | 1.62 | |
| C19 | | | | 0.63 | | 0.56 | |
| Total | 100.00 | 100.00 | 100.00 | 100.00 | 100.00 | 100.00 | 100.00 |

(Units: Mass %)

The amounts of normal paraffins and isoparaffins were obtained by using gas chromatography in accordance with ASTM D2887 "Standard Test Method for Boiling Range Distribution of Petroleum Fractions by Gas Chromatography", and calculating the hydrocarbon amounts of the various carbon numbers from the chromatograms obtained. In other words, the retention time was set taking a mixture of normal paraffins as the standard, and the content of normal paraffins was obtained from peak area values for the normal paraffins, Column tank temperature rise conditions: 35° C. (5 minutes)→10° C./minute (temperature rise)→320° C. (11.5 minutes)

Specimen volatilisation chamber conditions: 320° C. fixed split ratio 150:1

Detector portion: 320° C.

Reforming tests were carried out for the hydrocarbon fuel oils shown in Tables 1 and 2. The results of the conversion (conversion rate at each reforming temperature) were as shown in Table 3. The reforming test conditions were as follows.

Reforming Test

The reforming test was carried out using an atmospheric-pressure fixed-bed throughflow type of reaction apparatus. 50 ml of the noble metal-based reforming catalyst was packed into the reaction tube, and a steam reforming treatment was carried out by making the volatilised raw material oil flow together with the steam. The reforming treatment conditions were:—pressure: atmospheric pressure, steam/carbon molar ratio (S/C): 3.0, LHSV: 0.75 h$^{-1}$, reforming temperature: 750° C. to 360° C. (measurements from 750° C. to 400° C. in 50° C. graduations).

The conversion rate is defined by Formula (1) below.

$$\text{Conversion rate (\%)} = \frac{\text{Total amount of carbon in } C1 \text{ to } C14 \text{ compounds in reformer outlet gas over time (molar flow)}}{\text{Total amount of carbon in supplied fuel oil over time (molar flow)}} \times 100 \quad (1)$$

The composition of the outlet gas was analysed by gas chromatography, and the flow rate was measured by means of a volumetric flow meter.

TABLE 3

|  | Ex. 1 | Ex. 2 | Ex. 3 | Comp. Ex. 1 | Comp. Ex. 2 | Comp. Ex. 3 | Comp. Ex. 4 |
|---|---|---|---|---|---|---|---|
| 360° C. | 6.0 | 5.3 | 5.8 | 3.6 | 3.4 | 3.0 | 2.6 |
| 400° C. | 17.4 | 16.7 | 16.6 | 12.0 | 12.0 | 11.5 | 10.0 |
| 450° C. | 39.2 | 40.2 | 40.2 | 32.1 | 34.8 | 34.2 | 30.0 |
| 500° C. | 75.7 | 75.7 | 75.1 | 65.7 | 70.3 | 70.0 | 62.2 |
| 550° C. | 100 | 100 | 100 | 100 | 100 | 100 | 100 |
| 600° C. | 100 | 100 | 100 | 100 | 100 | 100 | 100 |
| 650° C. | 100 | 100 | 100 | 100 | 100 | 100 | 100 |
| 700° C. | 100 | 100 | 100 | 100 | 100 | 100 | 100 |

(Units: %)

In the reforming tests, given that it was difficult, for reasons of measurement efficiency, to measure the conversion rate if the reaction temperature was less than 360° C., measurements were not carried out at a reaction temperature of 310° C. Therefore, it has been confirmed from the following procedure that it was possible to reduce the inlet temperature in the reforming apparatus for the aforementioned Examples.

First, a calculation was made for the conversion rate at the necessary conditions for reforming at 310° C., that is the specified temperature. The calculation used the relationships between the conversion rates and temperatures obtained from reforming tests of fuels with a high capability of being adopted as fuel cell system fuels. Table 4 shows the composition and properties of the fuels used in those reforming tests.

TABLE 4

|  |  | GTL kerosene | Desulphurised kerosene |
|---|---|---|---|
| Sulphur | Mass ppm | <1 | <1 |
| Composition |  |  |  |
| Saturates | Volume % | 100.0 | 83.4 |
| Aromatics | Volume % | 0.0 | 16.6 |
| Olefins | Volume % | 0.0 | 0.0 |
| Density | g/cm$^3$ | 0.7350 | 0.7984 |

TABLE 4-continued

|  |  | GTL kerosene | Desulphurised kerosene |
|---|---|---|---|
| Distillation characteristics |  |  |  |
| 0.5% distillation | ° C. | 125.2 | 102.2 |
| 5% distillation | ° C. | 141.8 | 141.8 |
| 10% distillation | ° C. | 149.6 | 157.6 |
| 20% distillation | ° C. | 152.0 | 172.4 |
| 30% distillation | ° C. | 153.0 | 184.4 |
| 40% distillation | ° C. | 160.6 | 195.6 |
| 50% distillation | ° C. | 166.2 | 207.0 |
| 60% distillation | ° C. | 174.2 | 217.8 |
| 70% distillation | ° C. | 175.8 | 233.0 |
| 80% distillation | ° C. | 183.6 | 247.4 |
| 90% distillation | ° C. | 196.2 | 264.8 |
| 95% distillation | ° C. | 202.8 | 278.4 |
| 99% distillation | ° C. | 216.0 | 307.6 |

The GTL kerosene of Table 4 was a kerosene fraction obtained by the above mentioned SMDS process, and the desulphurised kerosene was a kerosene obtained by desulphurisation of a kerosene fraction obtained by distillation of crude oil, under conditions of 200° C. and LHSV=0.5 h$^{-1}$ using a commercial Ni-based adsorption desulphuriser.

Table 5 shows the results (conversion rate at each reforming temperature) obtained when carrying out the same reforming tests as for the Examples and Comparative Examples 1 to 4 in the case of the GTL kerosene and desulphurised kerosene of Table 4.

TABLE 5

|  | Desulphurised Kerosene | GTL kerosene |
|---|---|---|
| 400° C. | 10.5 | 20.7 |
| 360° C. | 3.8 | 10.2 |
| 340° C. | 1.8 | 5.7 |
| 320° C. | 1.1 | 3.3 |
| 310° C. | (0.4) | 2.0 |

(Units: %)

TABLE 6

|  | Boundary point conversion ratio |
|---|---|
| 450° C. | 35.6 |
| 400° C. | 14.3 |
| 360° C. | 6.1 |
| 340° C. | 3.3 |
| 320° C. | 1.9 |
| 310° C. | 1.0 |

(Units: %)

By inference from the calculated results shown in Table 6, or the results (approximation curves) of plots of the boundary points shown in Table 5, in order to be able to reform at 310° C. it is desirable to maintain a conversion rate of at least 35.6% at least under conditions of a reforming temperature of 450° C. For the Examples of Table 3 it was confirmed that they are reformed even at 310° C. given that a conversion rate of not less than 35.6% is maintained under conditions of 450° C.

Next, a confirmation was made regarding the requisite composition in order to achieve a fuel that can be reformed at 310° C.

The relationships shown in FIGS. 1 to 4 were obtained after rearrangement to show the relationships of the carbon distributions of the aforementioned Examples and Comparative Examples and the conversion rate at 450° C.

FIG. 1 shows the effect of the paraffin component with less than 13 carbons on the conversion rate. As regards Comparative Example 1, Comparative Example 2 and Comparative Example 3, if they are excluded because it is considered that they are dominantly influenced by the normal paraffins and isoparaffins with a high number of carbons (a factor discussed below), it can be seen from the relationship of Example 1, Example 2, Example 3 and Comparative Example 4 that the conversion rate decreases as the amount of paraffins of less than 13 carbons is reduced. Also, in the case of a content of paraffins of less than 13 carbons of 60% by mass or more, the conversion rate at 450° C. can be confirmed to be not less than 35.6%.

Figure 2:
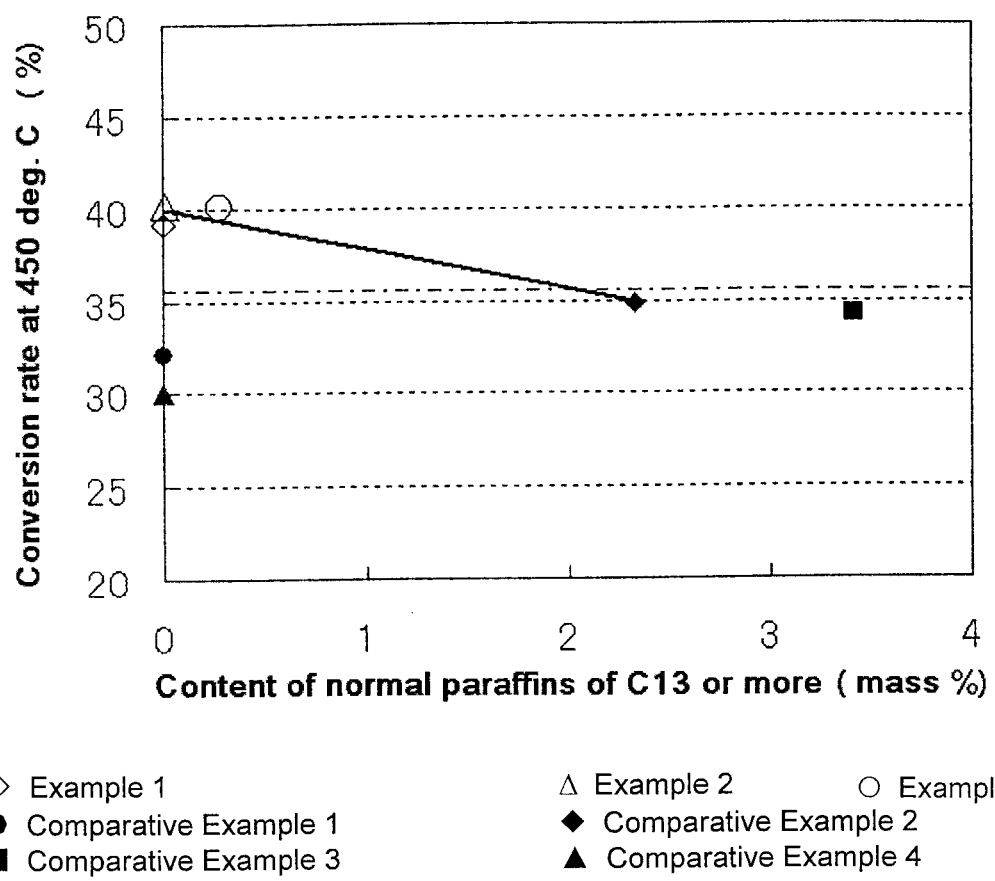
FIG. 2—This figure represents a graph showing the relationship of the content of normal paraffins of 13 or more carbons and the conversion rate at 450° C.

FIG. 2 shows the effect of the normal paraffin component with 13 or more carbons on the conversion rate. Comparative Example 4 may be considered to be dominantly influenced by the aforementioned paraffins with less than 13 carbons. Comparative Examples 1 and 3 may be considered to be dominantly influenced by the isoparaffins with a high number of carbons. Therefore, if these are excluded, it can be seen from the relationship of Example 1, Example 2, Example 3 and Comparative Example 2 that the conversion rate decreases as the normal paraffins of C13 or more increase. Also, in the case of a content of normal paraffins with C13 or more of not more than 2% by mass, the conversion rate at 450° C. can be confirmed to be not less than 35.6%.

Figure 3:
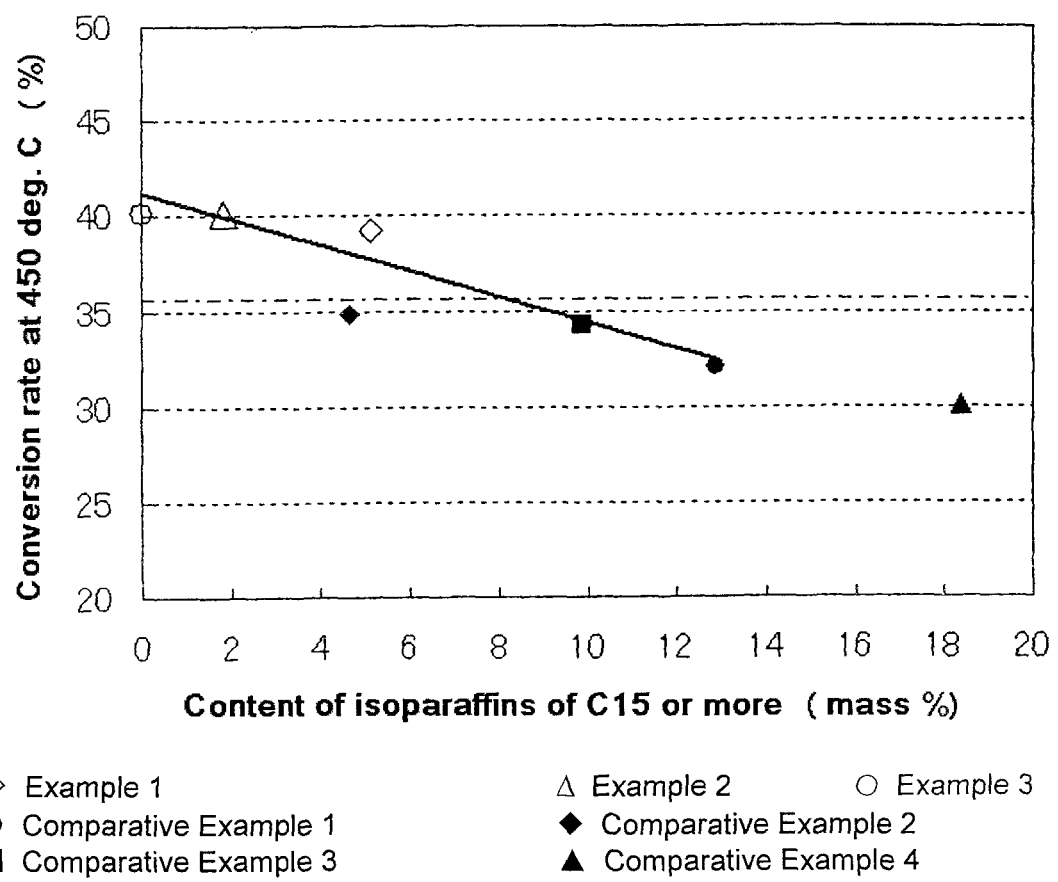
FIG. 3—This figure represents a graph showing the relationship of the content of isoparaffins of 15 or more carbons and the conversion rate at 450° C.
Figure 4:
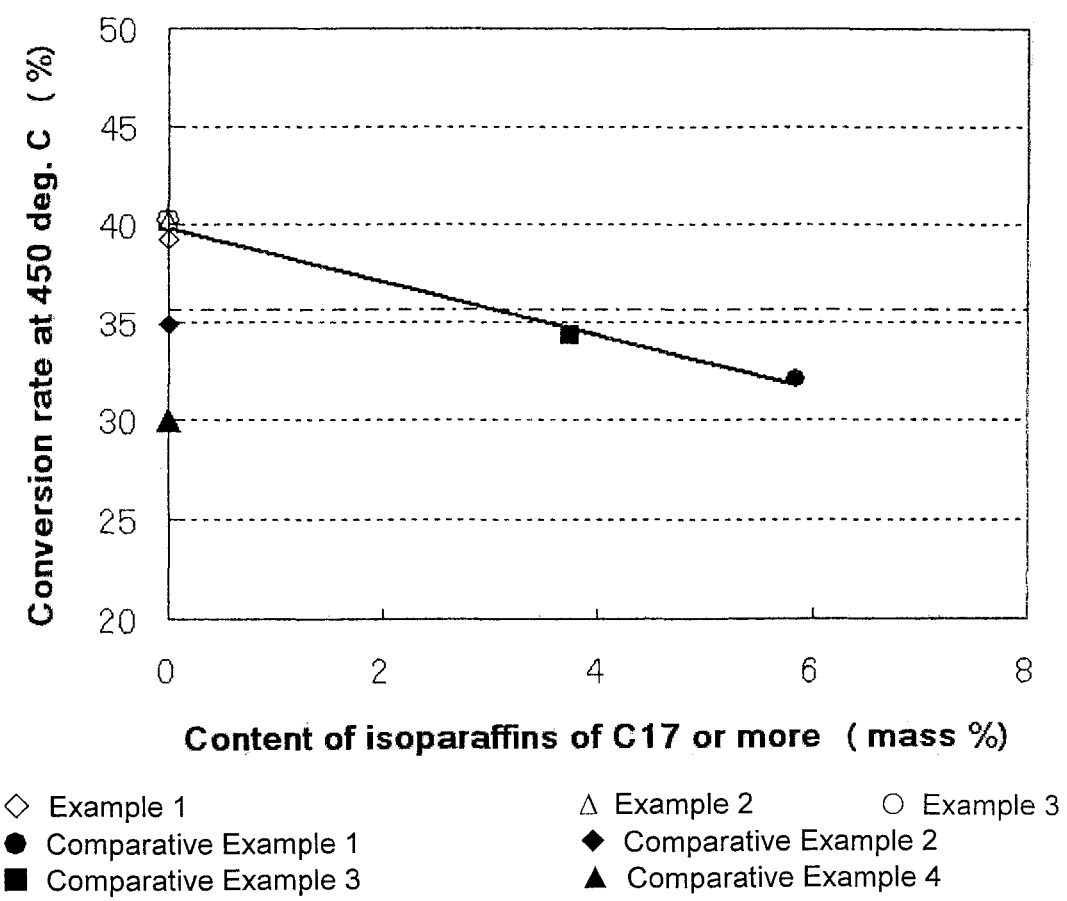
FIG. 4—This figure represents a graph showing the relationship of the content of isoparaffins of 17 or more carbons and the conversion rate at 450° C.
Figure 5:
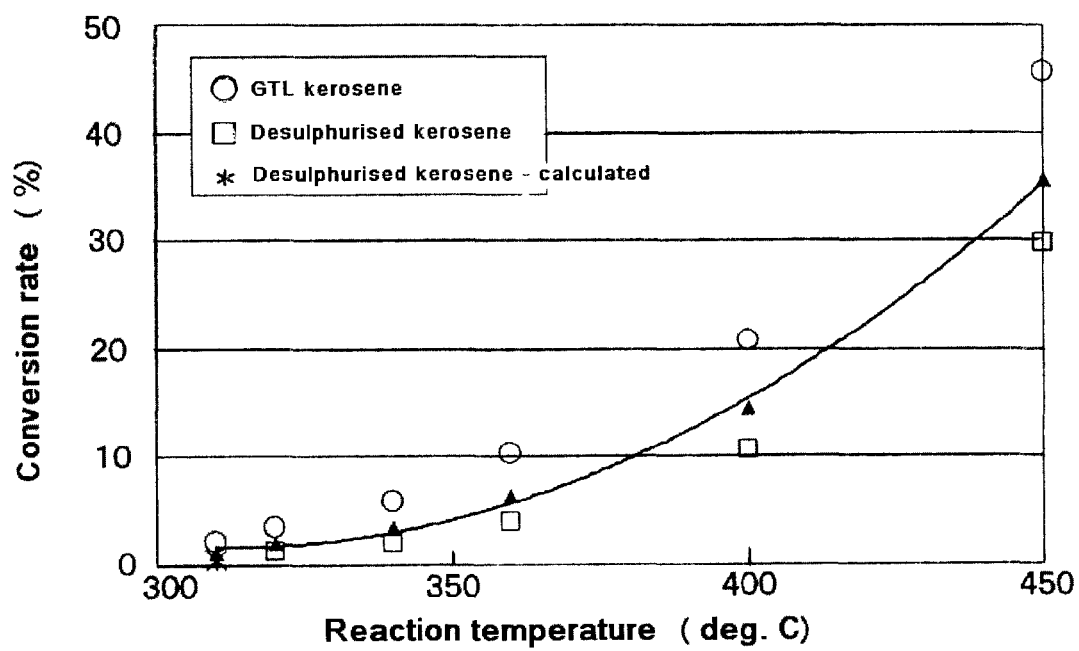
FIG. 5—This figure represents a graph showing a plot at each reaction temperature of the conversion ratio where the boundary point is such that reforming can be achieved at 310° C.

Next an investigation was made in respect of isoparaffins with a large number of carbons. First of all, in the case of hydrocarbon fuel oil with paraffins as the main constituent for use in fuel cell systems there has hardly been any consideration of the influence of isoparaffins with many carbons in investigations so far, but it can be confirmed from the Examples that even if they include isoparaffins of 15 or more carbons, a satisfactory conversion rate can be obtained. FIG. 3 shows the effect of the isoparaffin component with 15 or more carbons on the conversion rate. Comparative Example 4 may again be considered to be dominantly influenced by the aforementioned paraffins with less than 13 carbons. Comparative Examples 2 and 3 may be considered to be dominantly influenced by the normal paraffins with a high number of carbons. Therefore, if these are excluded, it can be seen from the relationship of Example 1, Example 2, Example 3 and Comparative Example 1 that the conversion rate decreases as the isoparaffins of C15 or more increase. Also, in the case of a content of isoparaffins with C15 or more of 9% or less by mass, the conversion rate at 450° C. can be confirmed to be not less than 35.6%. Also, from the Examples, the conversion rate at 450° C. can be confirmed to be not less than 35.6% if it is 0.01% by mass, or 1.8% by mass or 2% by mass. Further, if an investigation is similarly made of FIG. 4 where there has been a rearrangement in respect of the isoparaffin component with 17 or more carbons, in the case where the isoparaffins of C17 or more are not more than 3% by mass, the conversion rate at 450° C. can be confirmed to be not less than 35.6%.

On the basis of these results it can be seen that the requisite composition in order to achieve a fuel oil where the conversion rate is not less than 35.6%, that is in order to achieve a fuel which can be reformed at 310° C., is as follows.
(1) The paraffins of less than 13 carbons constitute not less than 60% by mass
(2) The isoparaffins of 15 or more carbons constitute from 0.01 to 9% by mass
(3) The normal paraffins of 13 or more carbons constitute not more than 2% by mass.

Also, in the case where isoparaffins of 17 or more carbons are incorporated as a constituent with a greater number of carbons, if this is not more than 3% by mass the fuel can be reformed at 310° C.

We claim:

1. A method of operating a fuel cell system containing a reforming apparatus, said method comprising:
   (a) providng a hydrocarbon fuel oil with paraffins as the main constituent to the fuel cell system at an inlet temperature to the reforming apparatus of at least 310° C., said hydrocarbon fuel oil having:
      (1) paraffins of less than 13 carbons constitute not less than 60% by mass;
      (2) isoparaffins of 15 or more carbons constitute from 0.01 to 9% by mass; and
      (3) normal paraffins of 13 or more carbons constitute not more than 2% by mass; and
   (b) operating the fuel cell system.

2. The method of claim 1 wherein the isoparaffins of 15 or more carbons constitute from 1.8 to 9% by mass.

3. The method of claim 2 wherein the isoparaffins of 15 or more carbons constitute from 2 to 9% by mass.

4. The method of claim 1 wherein the isoparaffins of 15 or more carbons constitute not more than 7% by mass.

5. The method of claim 2 wherein the isoparaffins of 15 or more carbons constitute not more than 7% by mass.

6. The method of claim 3 wherein the isoparaffins of 15 or more carbons constitute not more than 7% by mass.

7. The method of claim 1 wherein the isoparaffins of 17 or more carbons constitute not more than 3% by mass.

8. The method of claim 2 wherein the isoparaffins of 17 or more carbons constitute not more than 3% by mass.

9. The hydrocarbon fuel oil method of claim 4 wherein the isoparaffins of 17 or more carbons constitute not more than 3% by mass.

10. The method of claim 1 wherein the paraffins of less than 13 carbons constitute not less than 70% by mass.

11. The method of claim 2 wherein the paraffins of less than 13 carbons constitute not less than 70% by mass.

12. The method of claim 4 wherein the paraffins of less than 13 carbons constitute not less than 70% by mass.

13. The method of claim 7 wherein the paraffins of less than 13 carbons constitute not less than 70% by mass.

14. The method of claim 10 wherein the paraffins of less than 13 carbons constitute not less than 75% by mass.

15. The method of claim 1 wherein the normal paraffins of 13 or more carbons constitute not more than 1% by mass.

16. The method of claim 2 wherein the normal paraffins of 13 or more carbons constitute not more than 1% by mass.

17. The method of claim 4 wherein the normal paraffins of 13 or more carbons constitute not more than 1% by mass.

18. The method of claim 7 wherein the normal paraffins of 13 or more carbons constitute not more than 1% by mass.

19. The method of claim 10 wherein the normal paraffins of 13 or more carbons constitute not more than 1% by mass.

20. The method of claim 14 wherein the normal paraffins of 13 or more carbons constitute not more than 1% by mass.

21. The method of claim 15 wherein the normal paraffins of 13 or more carbons constitute not more than 0.5% by mass.

22. The method of claim 1 wherein paraffins of 7 carbons or less constitute less than 1% by mass.

23. The method of claim 1 wherein the hydrocarbon fuel oil has the total amount of n-paraffins is up to 37.48% by mass.

* * * * *